US006089474A

United States Patent [19]

Marino

[11] Patent Number: 6,089,474
[45] Date of Patent: Jul. 18, 2000

[54] HOSE NOZZLE APPARATUS AND METHOD

[76] Inventor: Robert M. Marino, 4046 Fairway Dr., Medina, Ohio 44256

[21] Appl. No.: 09/233,615

[22] Filed: Jan. 19, 1999

[51] Int. Cl.[7] .......... G05B 1/30

[52] U.S. Cl. .......... 239/570; 239/452; 239/456; 239/459; 239/579; 137/517; 137/614.11; 137/614.19; 138/45; 251/351

[58] Field of Search .......... 239/569, 570, 239/574, 579, 451, 452, 456, 457, 459; 137/517, 614.11, 614.19; 138/45, 46; 251/351

[56] References Cited

U.S. PATENT DOCUMENTS

| | | | |
|---|---|---|---|
| 583,135 | 5/1897 | Wilson | 239/457 |
| 584,197 | 6/1897 | Snider . | |
| 603,144 | 4/1898 | Kellerman et al. . | |
| 692,571 | 2/1902 | Wieman . | |
| 1,072,951 | 9/1913 | Johnston . | |
| 1,132,935 | 3/1915 | Hopkins . | |
| 1,823,277 | 9/1931 | Lum . | |
| 2,176,699 | 10/1939 | Anderson . | |
| 2,271,800 | 2/1942 | Meussdorffer . | |
| 2,331,741 | 10/1943 | Smith . | |
| 2,389,642 | 11/1945 | Schellin et al. . | |
| 2,991,016 | 7/1961 | Allenbaugh, Jr. | 239/569 X |
| 3,363,842 | 1/1968 | Burns . | |
| 3,539,112 | 11/1970 | Thompson | 239/570 X |
| 3,837,362 | 9/1974 | Barnes | 138/45 |
| 3,863,844 | 2/1975 | McMillan | 239/459 X |
| 4,289,277 | 9/1981 | Allenbaugh | 239/459 X |
| 4,342,426 | 8/1982 | Gagliardo | 239/457 |
| 4,383,550 | 5/1983 | Sotokazu | 137/517 |
| 4,770,212 | 9/1988 | Wienck | 138/45 |
| 4,982,897 | 1/1991 | Matusita et al. | 239/456 X |

*Primary Examiner*—Andres Kashnikow
*Assistant Examiner*—Robin O. Evans
*Attorney, Agent, or Firm*—David R. Percio; Ralph E. Jocke

[57] ABSTRACT

An apparatus (100) for selectively discharging a stream of liquid has a body (102) adapted for connection to a source of liquid under pressure, a throttle valve assembly (120) for maintaining a constant output flow throughout changes in supply pressure, a smooth bore barrel (140) for providing a deluge stream, a fog tip (160) for providing an aspirated fog spray and a shut off valve (180). The fog spray pattern is variable from a straight stream parallel to the axis of the apparatus to a wide spray at an angle to the axis of the apparatus. The deluge stream and the fog spray are selectable separately or in combination.

32 Claims, 17 Drawing Sheets

HOSE NOZZLE APPARATUS AND METHOD

TECHNICAL FIELD

This invention relates to a hose nozzle apparatus and method for maintaining the flow of a liquid stream as liquid pressure changes. More specifically this invention relates to a fire fighting hose nozzle apparatus and method for provided a deluge stream or a fog spray or both to a fire at a selected flow rate independent of supply pressure.

BACKGROUND ART

Fire hose nozzles are used by fire fighters for supplying water or other liquids to extinguish fires. A common method of extinguishing fires is to direct a flow of liquid, usually water, onto the fire and often the surrounding area. The flow is typically delivered in a deluge, also known as a smooth bore or in a fog. The deluge or smooth bore provides a straight and solid stream, with maximum reach and penetration. The fog provides a pattern which can be a straight, aspirated spray or a wide, aspirated spray with less reach and penetration than a deluge.

A deluge can be delivered in a relatively precise area thus providing a maximum amount of water into a specific location. The flow rate may have to be reduced, or increased, depending on the changing character of the fire.

Fire fighters may use the fog to cover a wider area and without the force of a deluge which might scatter burning materials before they are extinguished, thus spreading a fire. They may also use the spray in a very wide pattern to create a shield from the intense heat of a fire. The wide fog pattern also creates a back draft which brings cooler, cleaner air from behind the fire fighter. A wide fog will more quickly lower the heat of a fire by flashing into steam.

Fire fighters may ideally need both flow types for the same fire and may prefer to move from deluge to fog and back. To accomplish this it is necessary to stop the flow and change nozzles.

Certain nozzles in the prior art, hereinafter referred to as combination nozzles, include both a deluge and a spray. The outer fog, which is always a wide pattern, deprives the fire of heat by evaporating water into steam, while the deluge maintains a high penetration full stream flow to the source of the fire. Combination nozzles of the prior art have a fixed fog pattern around a fixed deluge. They cannot produce a straight fog spray, nor can the fog and deluge operate independently of each other.

Combination nozzles of the prior art were intended to overcome the limitations of having to change single nozzles or use two different hoses simultaneously when two patterns were needed. However, combination nozzles of the prior art have several drawbacks. The flow is altered when additional streams are enabled. The prior art combination nozzles increase the area of discharge, and therefore the flow rate, force, pressure and nozzle reaction. An increase in force may be more than a fire fighter using such a nozzle can safely handle.

Changes in source pressure can cause a sudden increase in flow rate, force and nozzle reaction with either single or combination nozzles of the prior art. This can occur when multiple lines are being run from a single pump or when other lines are shut down quickly. Also, combination nozzles of the prior art may produce weak sprays due to insufficient pressure when both tips are in use.

Thus there exists a need for an apparatus and method which permits quick, efficient and convenient operation of a fire hose nozzle in deluge mode, fog mode, or both, and which maintains a constant flow when changing from deluge or fog to both modes or when supply pressure changes.

DISCLOSURE OF INVENTION

It is an object of the present invention to provide an apparatus and method for maintaining the flow of a liquid stream as pressure changes.

It is a further object of the present invention to provide an apparatus and method for selectively varying the flow of a liquid stream and maintaining the selected flow as pressure changes.

It is a further object of the present invention to provide an apparatus and method for delivering two liquid streams for fire fighting.

It is a further object of the present invention to provide an apparatus and method for delivering either one or both of two liquid streams for fire fighting.

It is a further object of the present invention to provide an apparatus and method for delivering two liquid streams for fire fighting where the flows are selectively variable.

It is a further object of the present invention to provide an apparatus and method for delivering either one or both of two liquid streams for fire fighting where the flows are selectively variable.

It is a further object of the present invention to provide an apparatus and method for delivering either one or both of two liquid streams for fire fighting where the flows are selectively variable and maintaining the selected flows as pressure changes.

It is a further object of the present invention to provide an apparatus and method for delivering two liquid streams for fire fighting, where a first stream is aspirated with air and the second stream is not aspirated with air.

It is a further object of the present invention to provide an apparatus and method for delivering either one or both of two liquid streams for fire fighting where an outer aspirated stream is coaxial with an inner stream.

It is a further object of the present invention to provide an apparatus and method for delivering either one or both of two liquid streams for fire fighting, where a first stream is aspirated with air and may be varied from a narrow to a wide flow pattern.

It is a further object of the present invention to provide an apparatus and method for delivering either one or both of two liquid streams for fire fighting, where a first stream is aspirated with air and may be varied from a narrow to a wide flow pattern, and where foreign materials may be flushed from the system with the first stream in a flush setting while the second stream remains functional.

It is a further object of the present invention to provide an apparatus and method for delivering either one or both of two liquid streams for fire fighting, and which provide a constant flow when source pressure changes.

It is a further object of the present invention to provide an apparatus and method for delivering two liquid streams for fire fighting, where a first stream is aspirated with air and is outwardly coaxial with an inner stream which is not aspirated with air.

It is a further object of the present invention to provide an apparatus and method for delivering two coaxial liquid streams for fire fighting, where a first stream is aspirated with air and is outwardly coaxial with an inner stream which is not aspirated with air and where air moves between the two streams.

It is a further object of the present invention to provide an apparatus and method for delivering either one or both of two liquid streams for fire fighting where an outer aspirated stream is coaxial with an inner stream, and where the axial distance between the inner stream and the outer stream decreases as the flows move outwardly from the apparatus.

It is a further object of the present invention to provide an apparatus and method for delivering two coaxial liquid streams for fire fighting, where a first stream is aspirated with air and is outwardly coaxial with an inner stream which is not aspirated with air, where the axial distance between the inner stream and the outer stream decreases as the flows move outwardly from the apparatus, where air moves between the two streams at a lower pressure than air outside the outer stream, and where the two streams are made more compact and aerodynamic by the lower pressure air moving between the two streams, thus increasing the distance the streams may travel to allow the fire fights to remain at a safer distance.

It is a further object of the present invention to provide an apparatus and method for delivering either one or both of two liquid streams for fire fighting, which are efficient and economical.

The foregoing objects are accomplished in a preferred embodiment of the invention by a combination nozzle having a valve, a throttle, a smooth bore nozzle and an aspirated nozzle. The valve opens or closes the nozzle. The throttle automatically adjusts to unexpected or undesired increases in pressure from the water source to maintain the desired flow. The throttle may be positioned to vary the flow rate. The flows from smooth bore nozzle and the aspirated nozzle may be operated individually or together, and in varying sequences.

Further objects of the present invention will be made apparent in the following Best Mode For Carrying Out Invention and the appended claims.

BRIEF DESCRIPTION OF DRAWINGS

FIG. 1(*a*) is a partial cross-sectional view of a passage wall showing a taper section of one embodiment of a throttle valve of the present invention.

FIG. 6(*a*) is a cross-sectional view of the body of a fire hose nozzle of the present invention.

FIG. 6(*b*) is a cross-sectional view of the body a fire hose nozzle of the present invention showing the various chambers within the body.

FIG. 7(*a*) is a partial cross-sectional view of the passage wall of the body a fire hose nozzle of the present invention showing three taper sections of the throttle valve chamber.

BEST MODE FOR CARRYING OUT INVENTION

In the description herein the water supply point will be generally referred to as upstream from the discharge point, which will be referred to as downstream of the supply. Similarly supply and inlet may be used interchangeably and exit, output or discharge may be used interchangeably.

Figure 1:
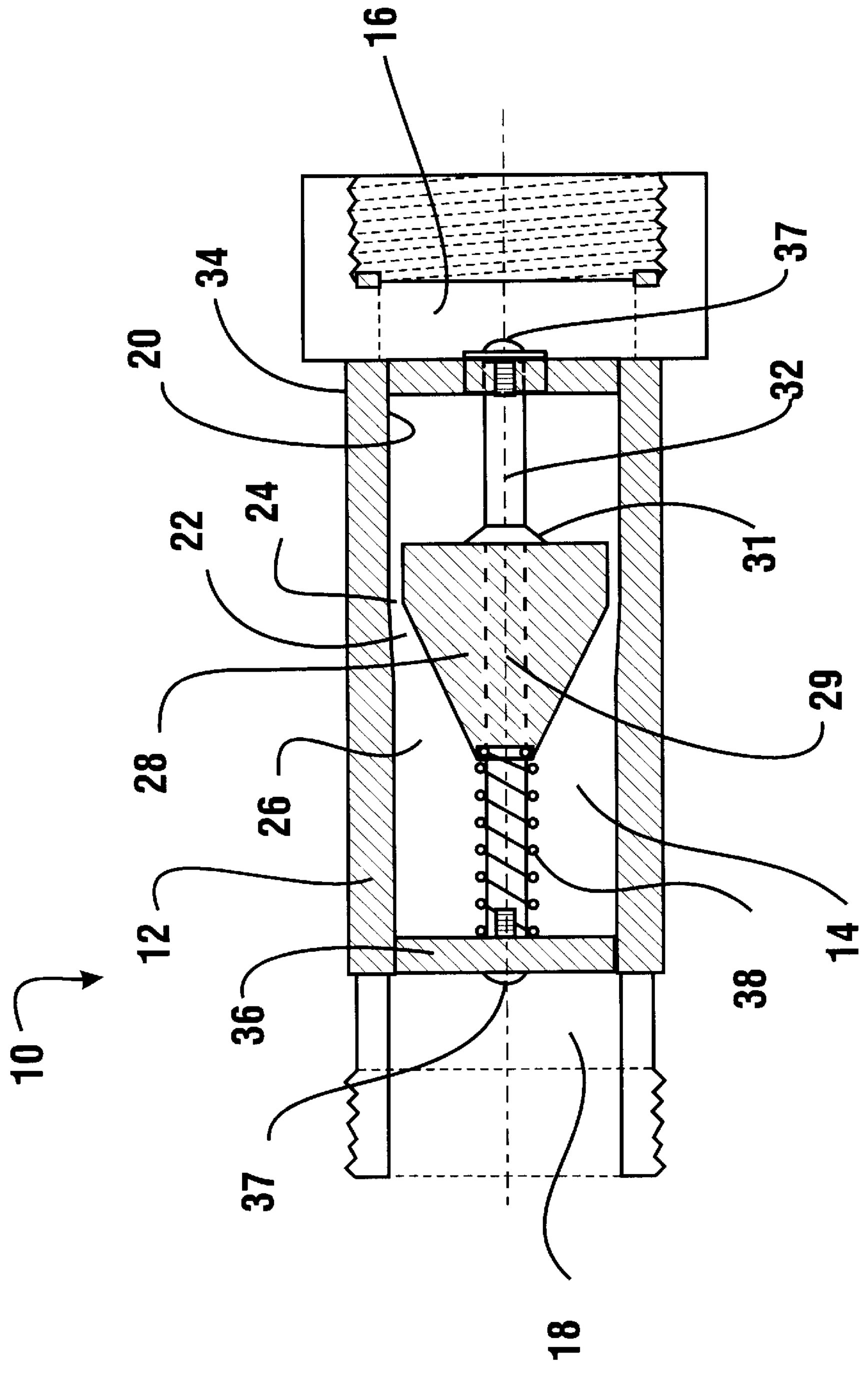
FIG. 1 is a cross-sectional view of one embodiment of a throttle valve of the present invention.
Figure 1A:
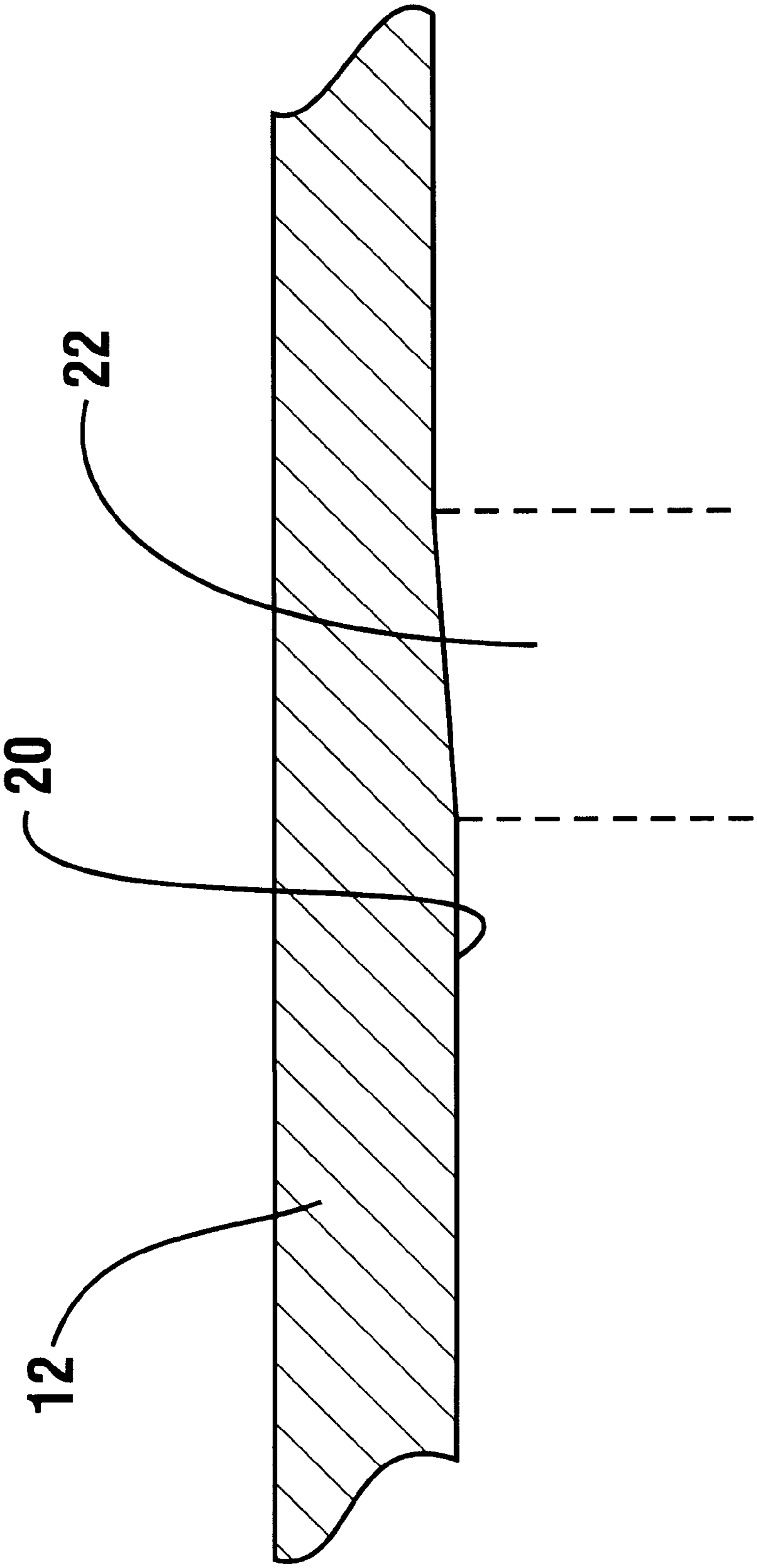

A preferred embodiment of throttle valve 10 of the invention is shown in FIG. 1. Throttle valve 10 has a body 12 with a passage 14 therethrough. Passage 14 has an inlet 16 and an outlet 18, and is bounded by a passage wall 20. Passage wall 20 has a taper section 22, further shown in FIG. 1(*a*), in which the cross-sectional area of passage 14 reduces from a larger diameter at taper inlet 24 to a smaller diameter at taper outlet 26. In this preferred embodiment the decrease in cross-sectional area of taper section 22 follows approximately a parabolic curve, but a linear or other curvilinear decreases in cross-sectional area may be used.

Passage wall 20 further bounds flow restricter 28, stop 31, rod 32 and struts 34 and 36. Flow restricter 28 has an aperture 29 and is in coaxial relation with passage wall 20. Rod 32 is held in connected relation with struts 34 and 36 by screws 37, or any convenient attachment means. Stop 31 is mechanically connected to rod 32 to limit upstream movement of flow restricter 28 to taper inlet 24. Rod 32 is in fixed coaxial relation with passage wall 20. As further shown in phantom in FIG. 1, aperture 29 bounds rod 32. Flow restricter 28 is slidable longitudinally on rod 32.

Rod 32 is further bounded by spring 38. Spring 38 is adjacent to strut 36 and may be in fixed mechanical connection with strut 36. As flow restricter 28 moves longitudinally along rod 32 toward outlet 18 spring 38 is compressed. In a preferred embodiment shown in FIG. 1, at a pressure above approximately 100 pounds per square inch ("PSI"), flow restricter 28 begins to slide along rod 32 in the direction of flow from inlet 16 toward outlet 18 and spring 38 is compressed. Spring 38 in this embodiment will compress approximately 0.00516 inches for each 1 PSI increase (approximately 0.516 inches for a rise in pressure of 100 PSI). The compression of spring 38 caused by the increased force moving flow restricter 28 as the pressure increases controls the movement of flow restricter 28, and thereby allows throttle valve 10 to maintain a constant flow. In other embodiments springs having different characteristics may be used to vary the amount of compression obtained for various increases in pressure.

As flow restricter 28 slides toward outlet 18 it moves through taper section 22. The cross-sectional area of taper section 22 decreases downstream of taper inlet 24. The decreasing cross-sectional area of taper section 22 and the downstream displacement of flow restricter 28 reduces the cross-sectional area through which water may flow, thereby countering the increase in pressure such that the flow rate, velocity of water discharged from outlet 18, force, and nozzle reaction force will be maintained at constant values.

Figure 2:
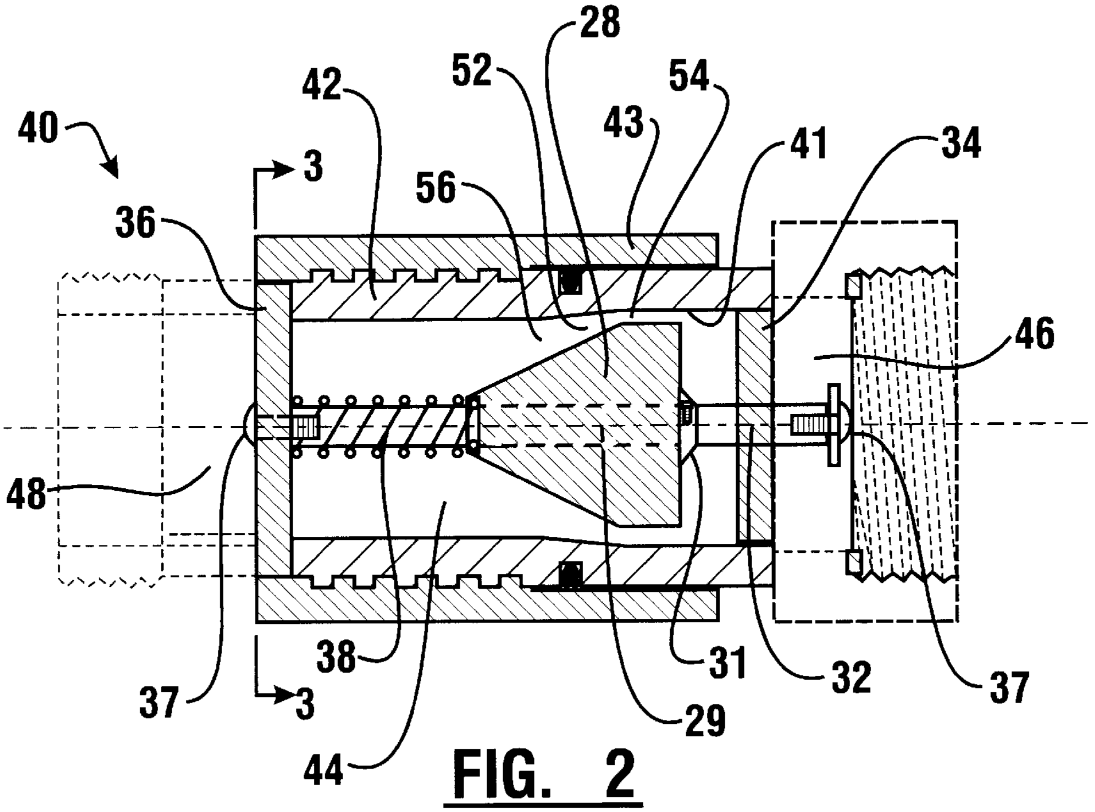
FIG. 2 is a cross-sectional view of an alternative embodiment of a throttle valve of the present invention shown at the maximum flow setting.
Figure 3:
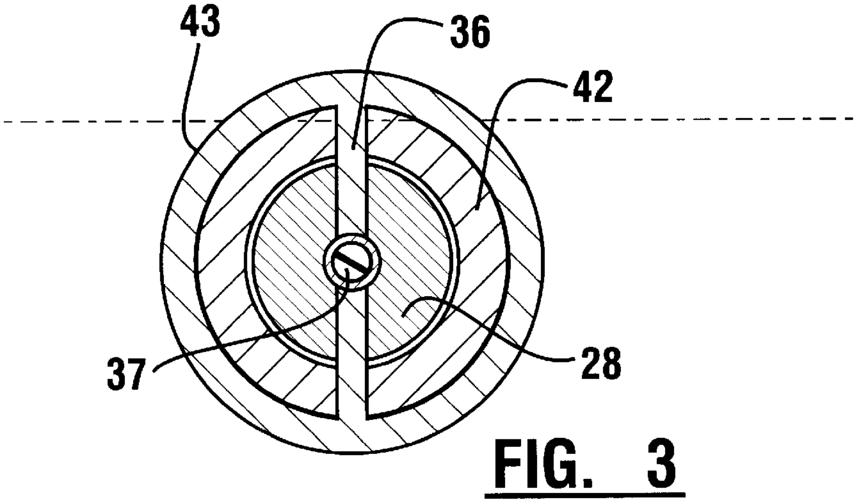
FIG. 3 is an end view of the throttle valve shown in FIG. 2.
Figure 4:
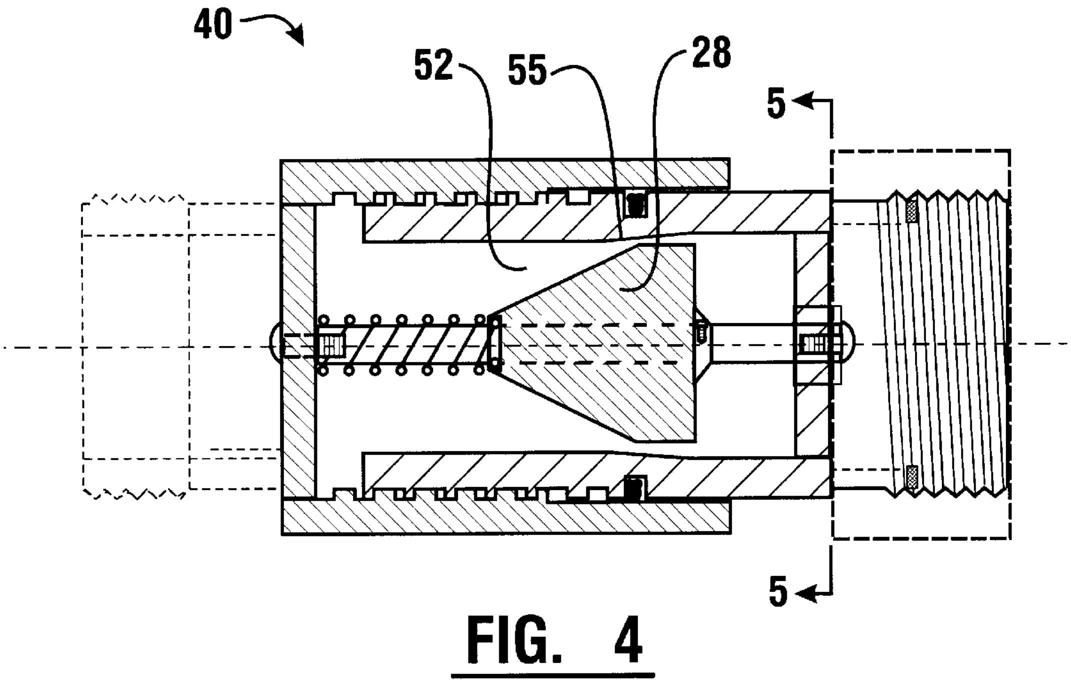
FIG. 4 is a cross-sectional view of an alternative embodiment of a throttle valve of the present invention shown at the minimum flow setting.
Figure 5:
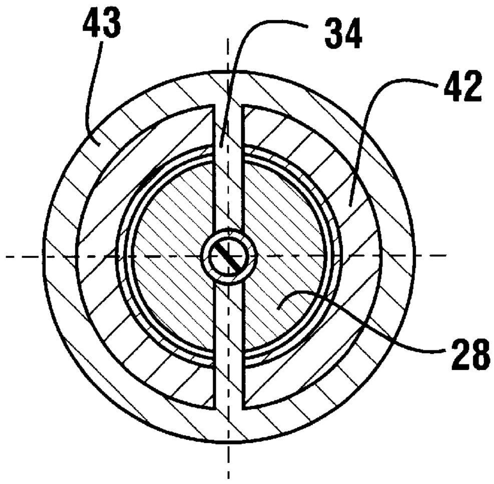
FIG. 5 is an end view of the throttle valve shown in FIG. 4.

Another embodiment of the invention is shown in FIGS. 2 through 5 wherein throttle valve 40 has selectable flow characteristics. In this embodiment body 12 previously described is replaced by a two piece body having a body inlet 42 and a body outlet 43 which are threadably connected. An O-ring or other well known sealing method may be used to prevent leakage through the threads. Threading body outlet 43 about body inlet 42 varies the cross-sectional area of taper section 52 adjacent flow restricter 28. FIG. 2 depicts the maximum flow setting and FIG. 4 depicts minimum flow setting. As shown in FIG. 4, flow restricter 28 is adjacent to a set point 55 downstream of taper inlet 54 and upstream of taper outlet 56. This placement will produce a flow that is approximately one-half the flow with flow restricter 28 adjacent taper inlet 54 as shown in FIG. 2.

Referring again to FIG. 2, at a pressure above approximately 100 PSI flow restricter 28 begins to slide along rod 32 in the direction of flow from inlet 46 toward outlet 48, thereby compressing spring 38. Preferably spring 38 will compress approximately 0.00258 inches for each 1 PSI (approximately 0.258 inches for a rise in pressure of 100 PSI). The compression of spring 38 caused by the increased force moving flow restricter 28 as the pressure increases controls the movement of flow restricter 28, and thereby allows throttle valve 40 to maintain a constant flow.

Figure 6:
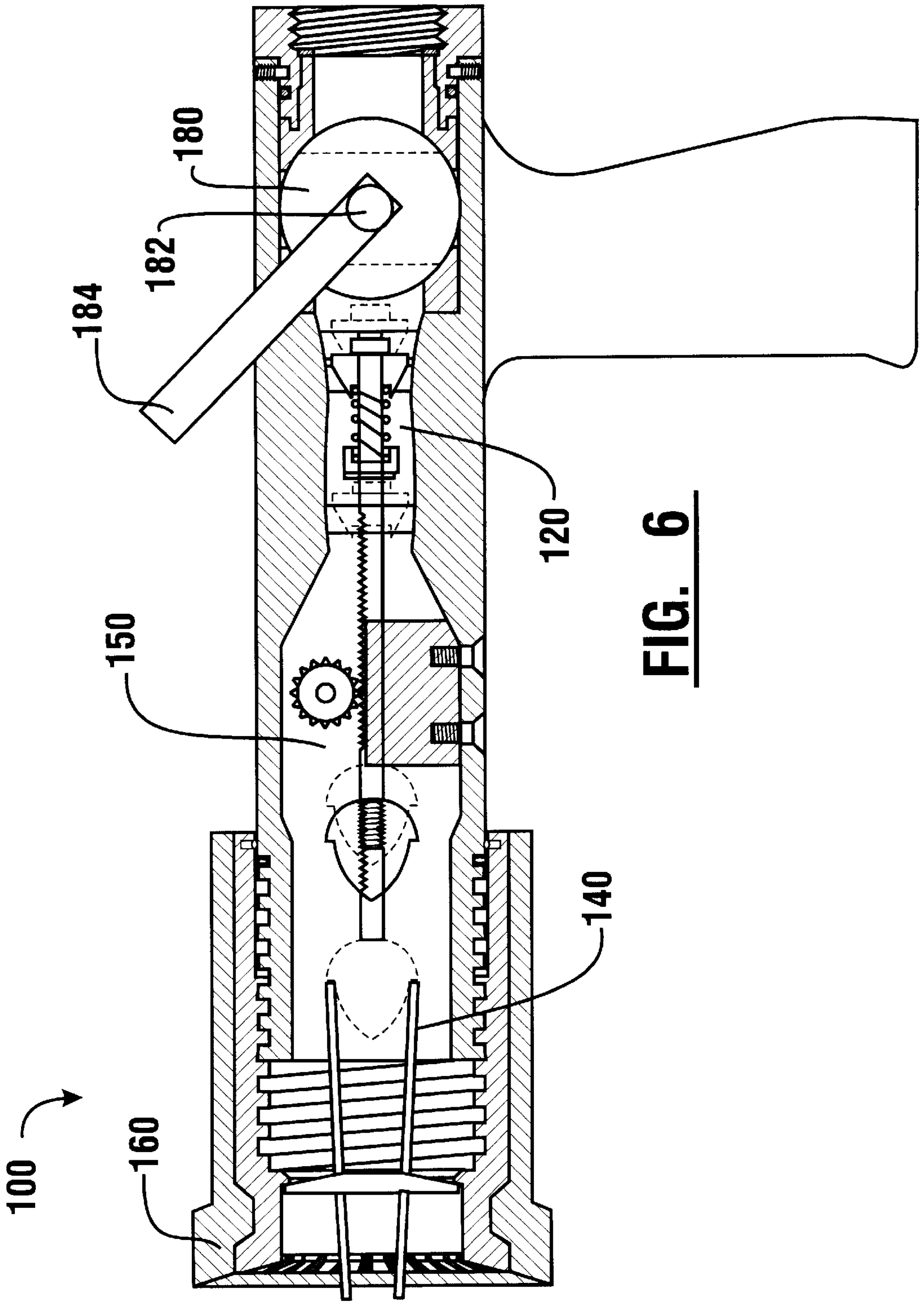
FIG. 6 is a cross-sectional view of a fire hose nozzle of the present invention with the valve in the closed position, the smooth bore barrel in the open position and the fog tip in the closed position.
Figure 6A:
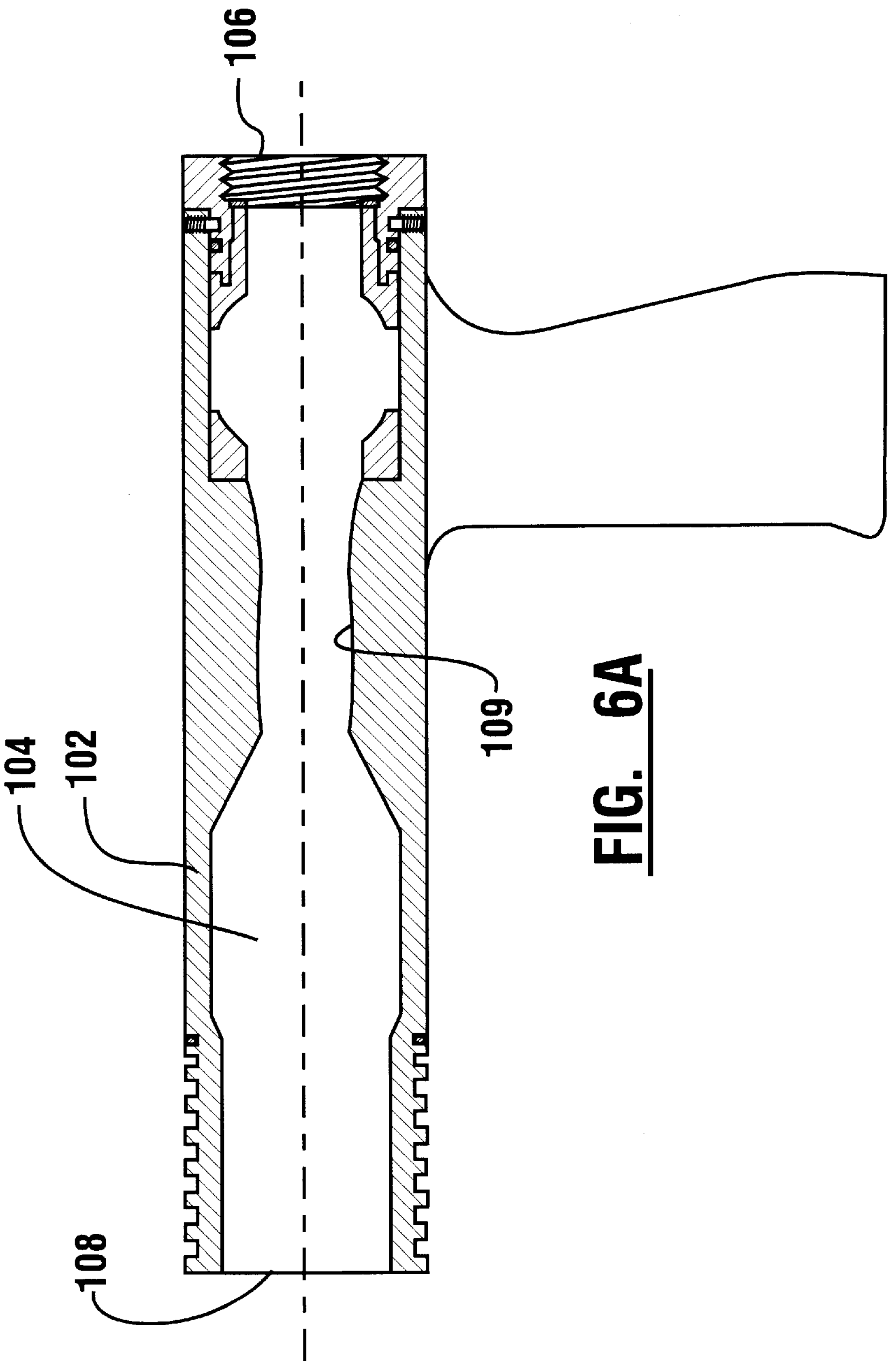
Figure 6B:
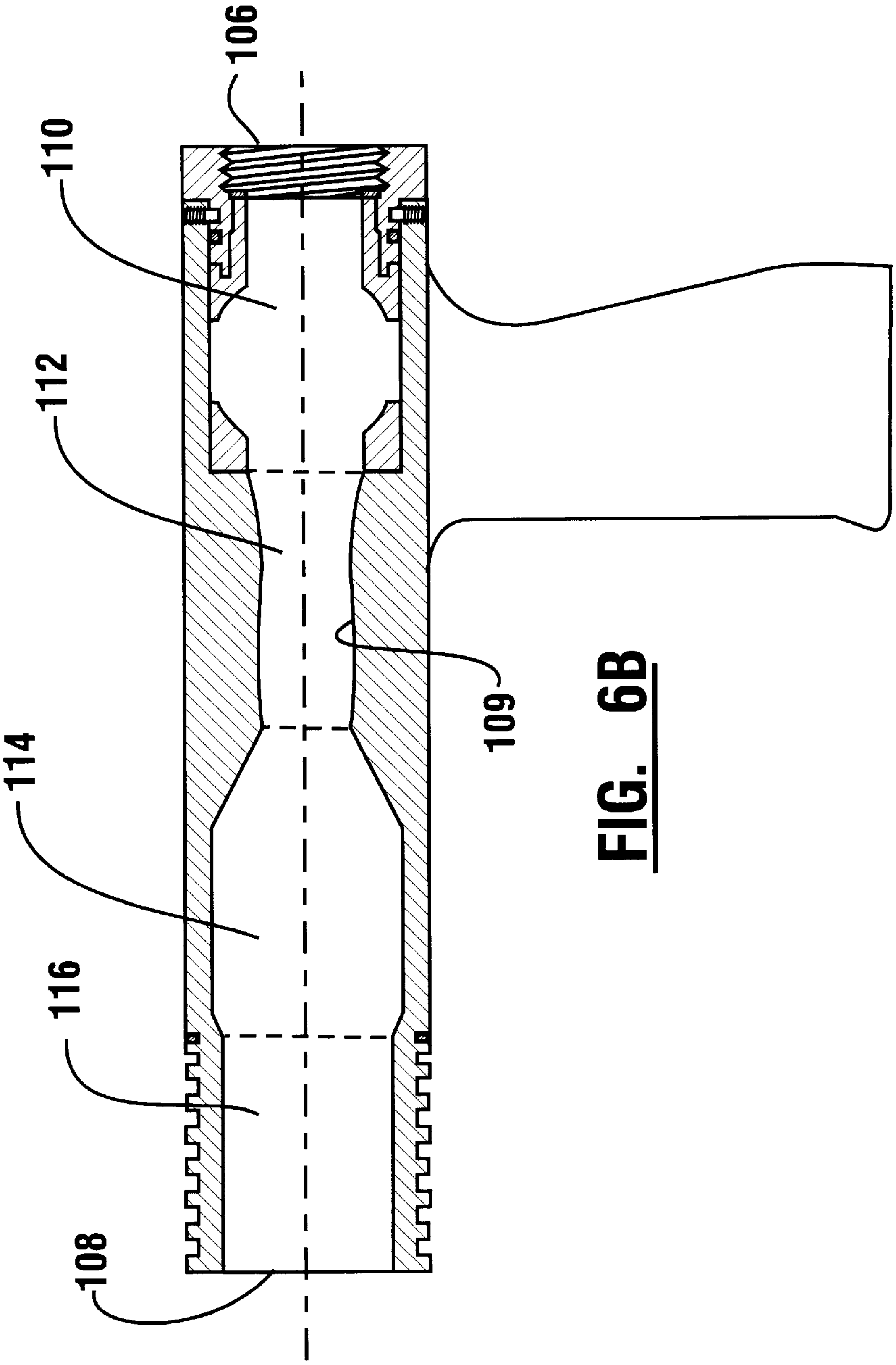

Another embodiment of the apparatus and method of the present invention is shown in FIG. 6. Shown generally are a throttle valve assembly 120, a smooth bore barrel 140, a bore plug assembly 150, a fog tip 160 and a shut off valve 180.

As shown in FIG. 6(*a*) body 102 has a passage 104 therethrough. Passage 104 has an inlet 106 and an outlet 108, and is bounded by a passage wall 109. As shown in FIG. 6(*b*) passage 104 further has a shut off valve chamber 110, a throttle valve chamber 112, a plug chamber 114 and a bore chamber 116.

Rotatably mounted within shut off valve chamber 110 shown in FIGS. 6(*b*) and 7 is a valve 180 shown in FIG. 6. Valve 180 in a preferred embodiment is a ball valve. Valve 180 is located adjacent passage inlet 106 and regulates the flow of water into passage 104. Valve 180 is mounted on a shaft 182. A handle 184 is mechanically connected to shaft 182. Rotating handle 184 rotates shaft 182, and valve 180 rotates to open or close passage inlet 106. Normally valve 180 is either in a full on or a full off position, but intermediate positions may also be selected. With valve 180 in a full off position, no water is permitted to enter passage 104.

Figure 7:
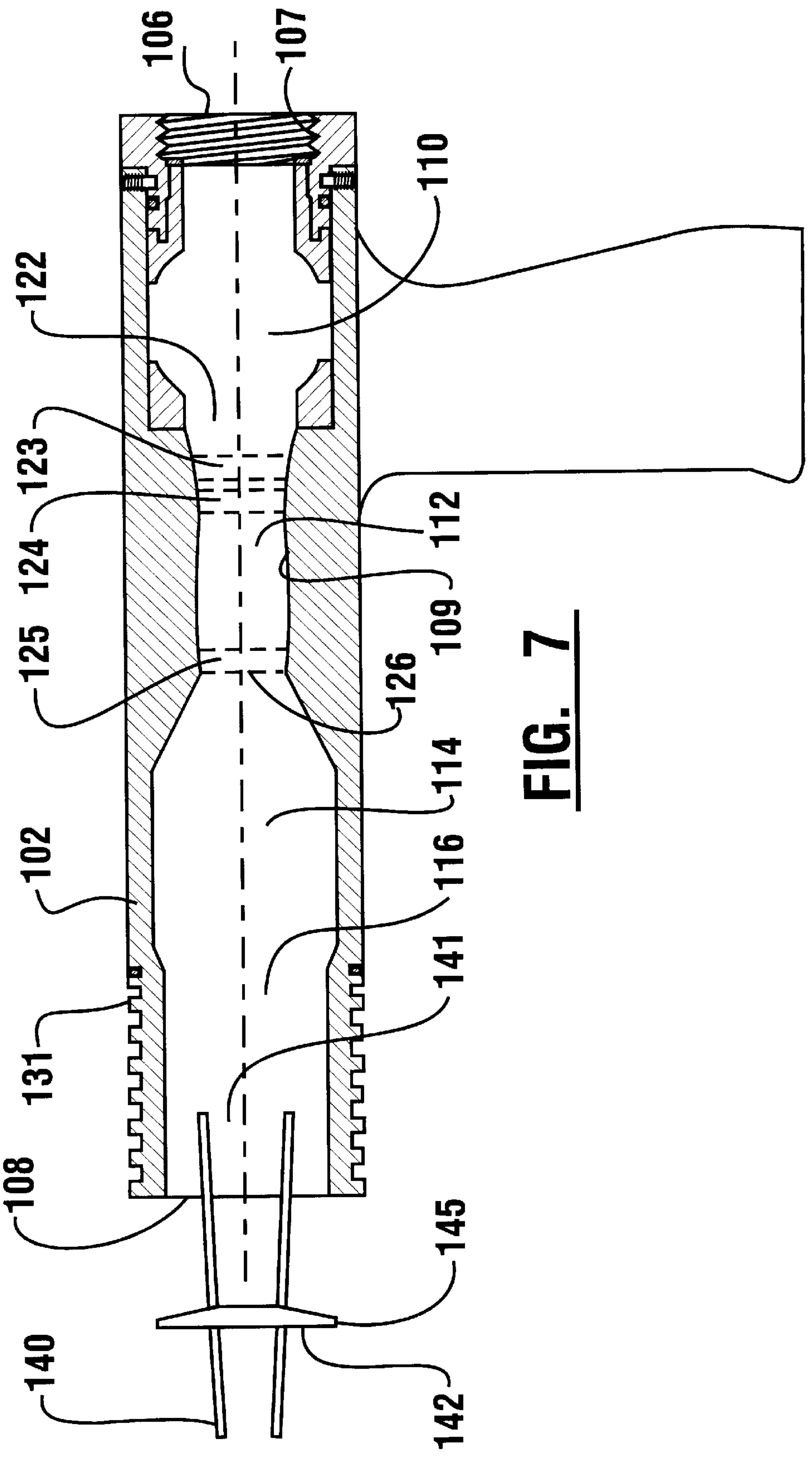
FIG. 7 is a cross-sectional view of the body a fire hose nozzle of the present invention showing the smooth bore barrel and the various sections of the throttle valve chamber.
Figure 7A:
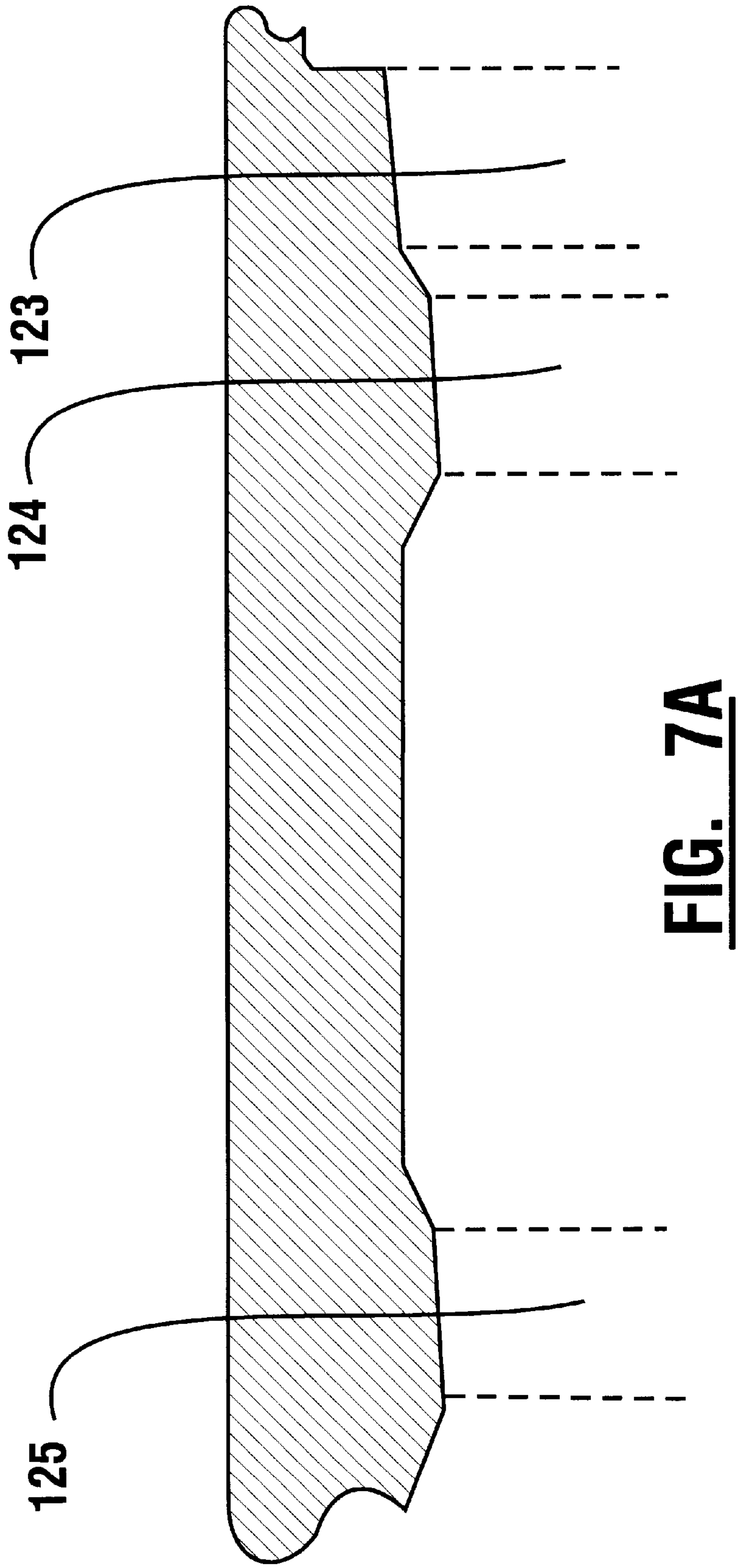

As further shown in FIGS. 7 and 7(*a*), throttle valve chamber 112 has three tapered sections 123, 124 and 125 between throttle valve chamber inlet 122 and throttle valve chamber outlet 126 at which the cross-sectional area of passage 104 is reduced. The cross-sectional area of throttle valve chamber inlet 122 is selected to permit debris to flow through passage 104 as will be described later.

In each taper section the cross-sectional area of passage 104 reduces from a larger diameter at the taper inlet or upstream side to a smaller diameter at the taper outlet or downstream side. Also, in this embodiment the cross-sectional area of the outlet of taper section 123 is at least as large as the inlets of tapered sections 124 and 125. Further taper section 124 is approximately the same as taper section 125 in inlet diameter, outlet diameter and length. Preferably the decrease in cross-sectional area of each of taper sections 123, 124 and 125 follows approximately a parabolic curve, but a linear or other curvilinear decrease in cross-section may be used. In alternative embodiments the cross-sectional area of the outlet of taper 123 may be smaller than the inlets of tapered sections 124 and 125 and taper section 124 may be larger or smaller than the same as taper section 125 in inlet diameter, outlet diameter and length.

Looking to FIGS. 6 and 6(*a*), passage 104 bounds a throttle valve assembly 120, a bore plug assembly 150 and a barrel 140. Throttle valve assembly 120 and bore plug assembly 150 each include rod 132 as will be described later.

Figure 8:
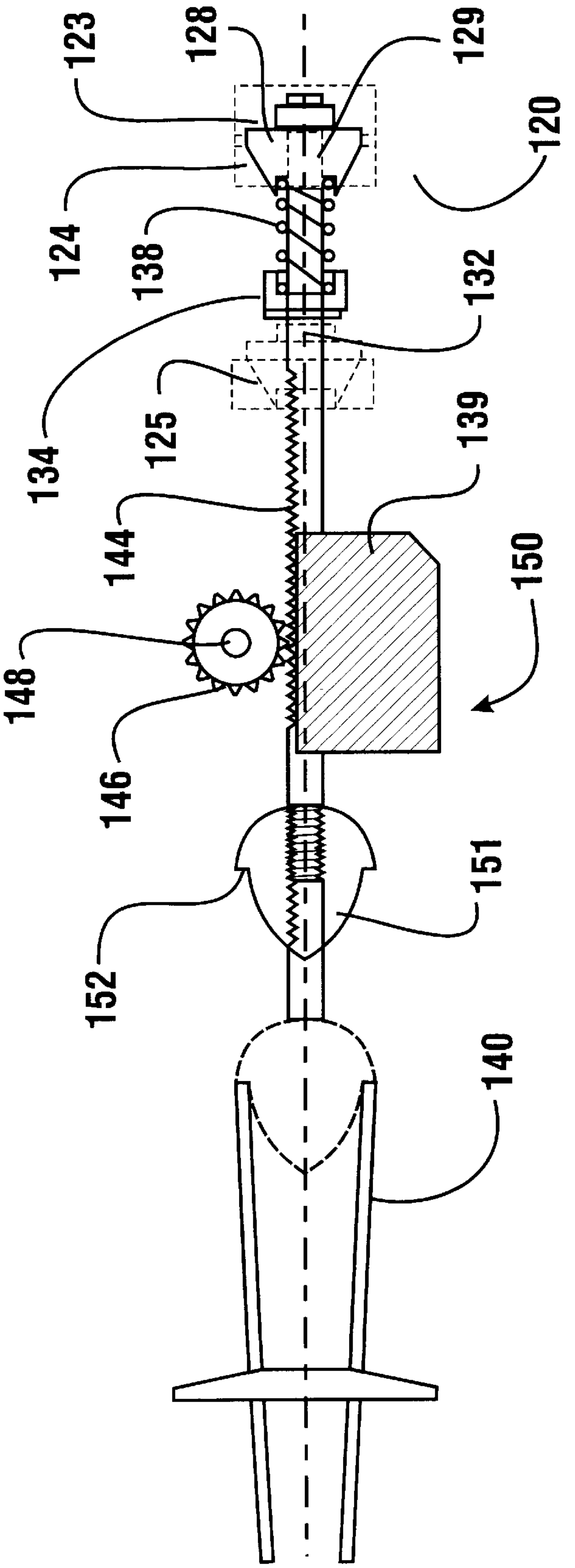
FIG. 8 is a cross-sectional view of the throttle valve assembly and the bore plug assembly in the open position for the smooth bore barrel as shown in FIG. 6.

As shown in FIG. 8, throttle valve assembly 120 has a flow restricter 128, rod 132 and stop 134. In this embodiment stop 134 is a locking ring fixed in place on rod 132. Flow restricter 128 is in coaxial relation with passage wall 109 as shown in FIGS. 6 and 6(*a*). Flow restricter 128 has an aperture 129 therethrough. As further shown in phantom in FIG. 8, aperture 129 bounds rod 132. Flow restricter 128 is slidable longitudinally on rod 132. Rod 132 is held in fixed coaxial relation with passage wall 109 by track 139 of bore plug assembly 150.

Rod 132 is further bounded by spring 138. One end of spring 138 is adjacent to flow restricter 128 and the other end of spring 138 is adjacent to stop 134. In this embodiment stop 134 has a collar into which the downstream end of spring 138 is attached. Flow restricter 128, rod 132, stop 134 and spring 138 are in bounded relation with throttle valve chamber 112, throttle valve chamber inlet 122 and throttle valve chamber outlet 126.

Throttle valve assembly 120 regulates the flow of water as water pressure changes. Looking to FIGS. 6 through 8, as pressure increases, preferably at a pressure above approximately 100 PSI, flow restricter 128 begins to slide along rod 132 in the direction of flow from throttle valve chamber inlet 122 toward throttle valve camber outlet 126 and thereby compress spring 138. As flow restricter 128 slides downstream within first taper section 123, the cross-sectional area of throttle valve chamber 112 becomes smaller. Flow of water through throttle valve chamber 112, and thereby also through passage 104 is thus maintained at a constant value or within a selected range of values.

As will be described later, rod 132 may be moved longitudinally within passage 104 by gear 146. Throttle valve assembly 120 may be moved downstream in throttle valve chamber 112 so that flow restricter 128 is moved out of first taper section 123 and into the upstream end of second taper section 124. As water pressure increases, flow restricter 128 moves longitudinally along rod 132 and spring 138 is compressed as described above for first taper section 123, and flow of water through throttle chamber 112, and thereby also through passage 104, is maintained. Alternatively throttle valve assembly 120 may be moved downstream so that flow restricter 128 is moved into the upstream end of third taper section 125 and flow of water through throttle chamber 112, and thereby also through passage 104, is maintained at a constant value or within a selected range of values as water pressure increases.

Additionally, throttle valve assembly 120 may be moved upstream from tapered section 123 and throttle valve chamber inlet 122. The larger cross-sectional area of passage 104 enables debris to flow past throttle valve assembly 120 and out of fire hose nozzle 100 through either smooth bore barrel 140 or fog tip 160.

Spring 138 in this embodiment will compress approximately 0.0035 inches for each 1 PSI in supply pressure increase (approximately 0.35 inches for a rise in pressure of 100 PSI). The compression of spring 138, which is caused by the increased force exerted on flow restricter 128 as the pressure increases, moves flow restricter 128 in the direction of flow. The sequential restriction of area of flow from the cooperation of flow restricter 128 and taper sections 123, 124 and 125 as the pressure increases maintains the flow rate, velocity, force, and nozzle reaction at approximately constant values or within selected ranges of values.

As shown in FIG. 7, fire hose nozzle inlet 106 is preferably threaded with internal threads 107 suitable for threaded connection to a threaded hose end (not shown). The outlet end of body 102 is preferably threaded with external threads 131. External threads 131 cooperate with fog tip 160 as will be described later. Adjacent to passage outlet end 108 and bounded coaxially by passage 104 in body 102 is a smooth bore barrel 140. Smooth bore barrel 140 may be retained in fixed coaxial relation with passage 104 by a frame of struts (not shown) or any other convenient means with an area small enough not to significantly impede the flow of water through passage 104.

Smooth bore barrel 140 is bounded by a baffle 142. Baffle 142 may be connected to barrel 140 by any convenient means. Preferably baffle 142 is releasably attachable to barrel 140 to facilitate assembly and disassembly of fire hose nozzle 100.

Barrel 140 has a bore 141 therethrough. Bore 141 is coaxial both with barrel 140 and with passage 114. Barrel 140 has an input end and a discharge end. Bore 141 may have a uniform cross-section, or the cross-section may vary along the length of the bore to achieve a variety of flow characteristics. In the embodiment shown in FIG. 7 bore 141 is tapered from a larger diameter at the input end to a smaller diameter at the discharge end and the thickness of baffle 142 in a direction parallel to the axis of passage 104 is greater adjacent barrel 140 than the thickness of baffle 142 at the perimeter adjacent fog tip 160.

A rim 145 circumscribes the outside diameter of baffle 142. The diameter of rim 145 is larger than the inside diameter of shoulder 168 of fog tip 160 (shown in FIG. 9). This larger diameter permits baffle 142 to cooperate with shoulder 168 to regulate the discharge of water from fog tip 160 as will be described later.

Downstream of stop 134 is bore plug assembly 150. As shown in FIGS. 6 and 8 bore plug assembly 150 includes rod 132, track 139, gear 146 and plug 151.

Rod 132 has external teeth 144 downstream of stop 134. Teeth 144 mesh with the teeth of a gear 146 to move rod 132 longitudinally in passage 104. Gear 146 may be mounted on a shaft 148 and rotated by a lever or wheel (not shown) outside body 102. As shown in FIGS. 6 and 8 gear 146 is disposed opposite track 139, but it may alternatively be upstream or downstream from track 139. Track 139 may be held in fixed connection within passage 104 by bolts, screws, welds or any other convenient means.

Mechanically connected to the downstream end of rod 132 is a plug 151. Plug 151 has a shoulder 152. Shoulder 152 cooperates with the inlet end of smooth bore barrel 140 to selectively seal barrel 140 and prevent water from passage 114 from entering barrel 140.

The teeth of gear 146 mesh with teeth 144 in rod 132. Rotating gear 146 as shown in FIGS. 6 and 8 moves plug 151 into or out of sealing relation with barrel 140. As gear 146 is turned clockwise, rod 132 and plug 151 are moved toward the inlet of barrel 140 until shoulder 152 completely seals the inlet end of plug 140. Conversely, rotating gear 146 in the counterclockwise direction opens barrel 140 and permits water to flow through it. The closed position is shown in phantom in FIG. 8.

As shown in FIGS. 6 and 8, plug 151 has a downstream end tapered to a point for passage into barrel 140 until shoulder 152 is seated against barrel 140, but plug 151 may be any shape, size and material suitable for sealing barrel 10.

Figure 9:
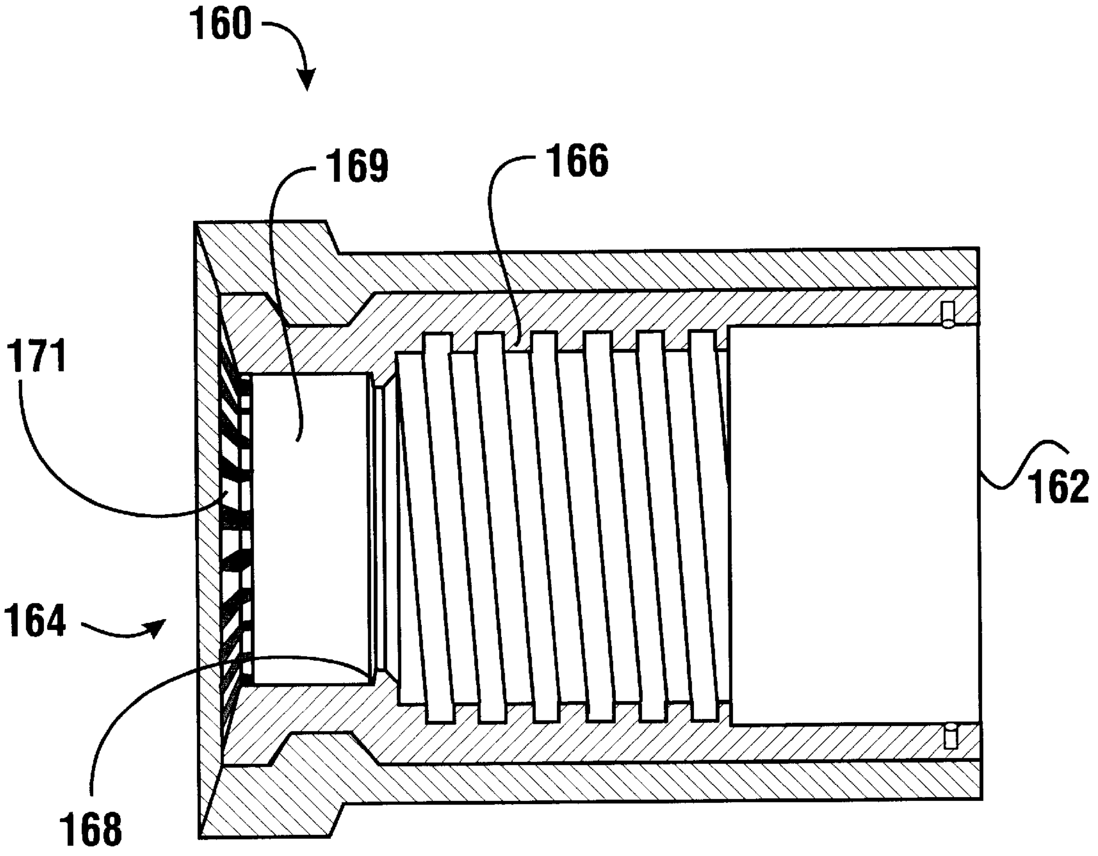
FIG. 9 is a cross-sectional view of the fog tip of the present invention.

As shown in FIG. 9, fog tip 160 has an input end 162 through which water enters and a discharge end 164 through which water is discharged. Fog tip 160 has an outlet chamber 169, a shoulder 168, and fog teeth 171. Outlet chamber 169 is disposed between seal 168 and fog teeth 171. Fog teeth 171 are disposed on discharge end 164. Fog tip 160 also has internal threads 166 which correspond to external threads 131 of body 102 to threadably connect fog tip 160 to body 102. Fog tip 160 is longitudinally adjustable with respect to body 102 by threading fog tip threads 166 along body output end threads 131.

Seal 168 is disposed inwardly from passage wall 109 toward the axis of body 102, which is also the axis of passage 104. As shown in FIG. 9, the inside diameter of the area circumscribed by seal 168 is smaller than the inside diameter of fog tip outlet chamber 169. The outside diameter of rim 145 of baffle 142 shown in FIG. 7 is also smaller than the inside diameter of fog tip outlet chamber 169. As was described above the outside diameter of rim 145 is larger than the inside diameter of seal 168. This larger diameter of rim 145 permits baffle 142 to cooperate with seal 168 to prevent water in bore chamber 116 from entering fog tip outlet chamber 169. Further, the larger diameter of fog tip outlet chamber 169 permits water to flow out of fog tip 160 when baffle 142 and seal 168 are not in sealing relation. Fog tip 160 may be rotated clockwise (when looking in the direction of discharge) about body 102 until shoulder 168 comes in contact with baffle 142 as shown in FIG. 6. With baffle 142 as shown in FIG. 6 even with valve 180 in an open position, the fog stream is prevented from flowing. With valve 180 in an open position, as fog tip 160 is rotated counterclockwise about body 112 so that baffle 142 and shoulder 168 are not in sealing relation, flow occurs. The water flow is aspirated by the fog teeth 171.

Figure 10:
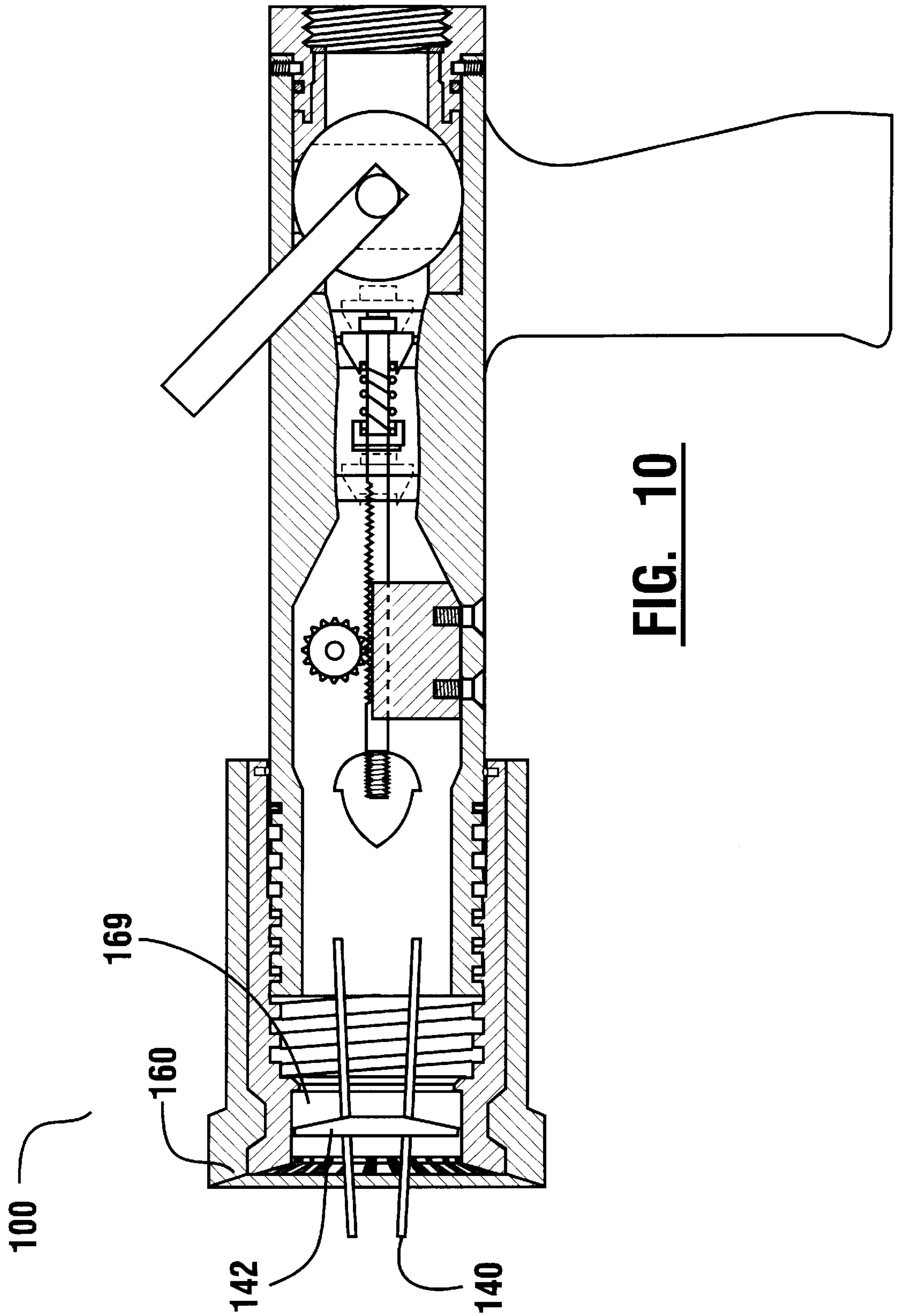
FIG. 10 is a cross-sectional view of a fire hose nozzle of the present invention with the valve in the closed position, the smooth bore barrel in the open position and the fog tip in an open position for a straight, hollow stream.
Figure 11:
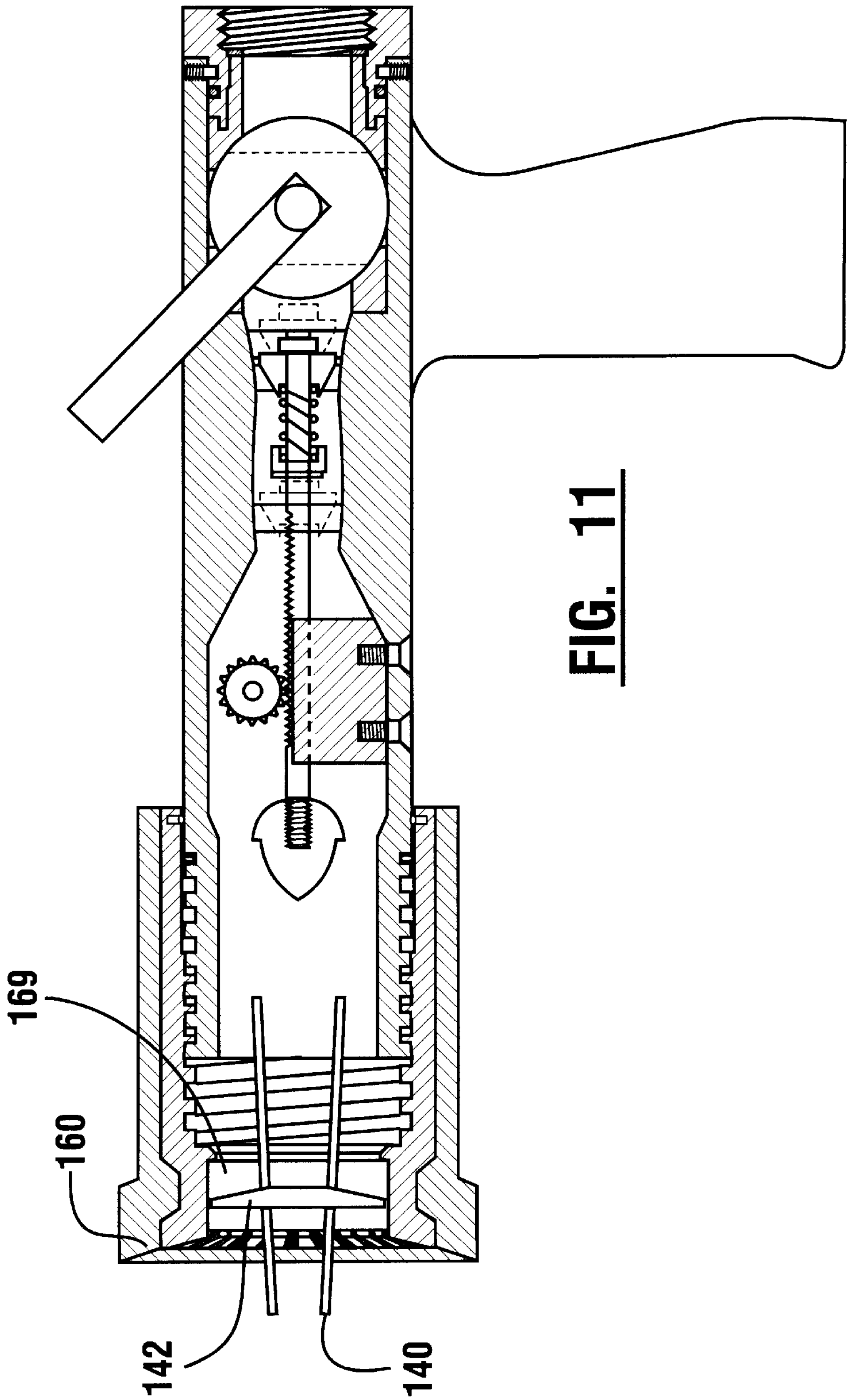
FIG. 11 is a cross-sectional view of a fire hose nozzle of the present invention with the valve in the closed position, the smooth bore barrel in the open position and the fog tip in an open position for a fog spray pattern.
Figure 12:
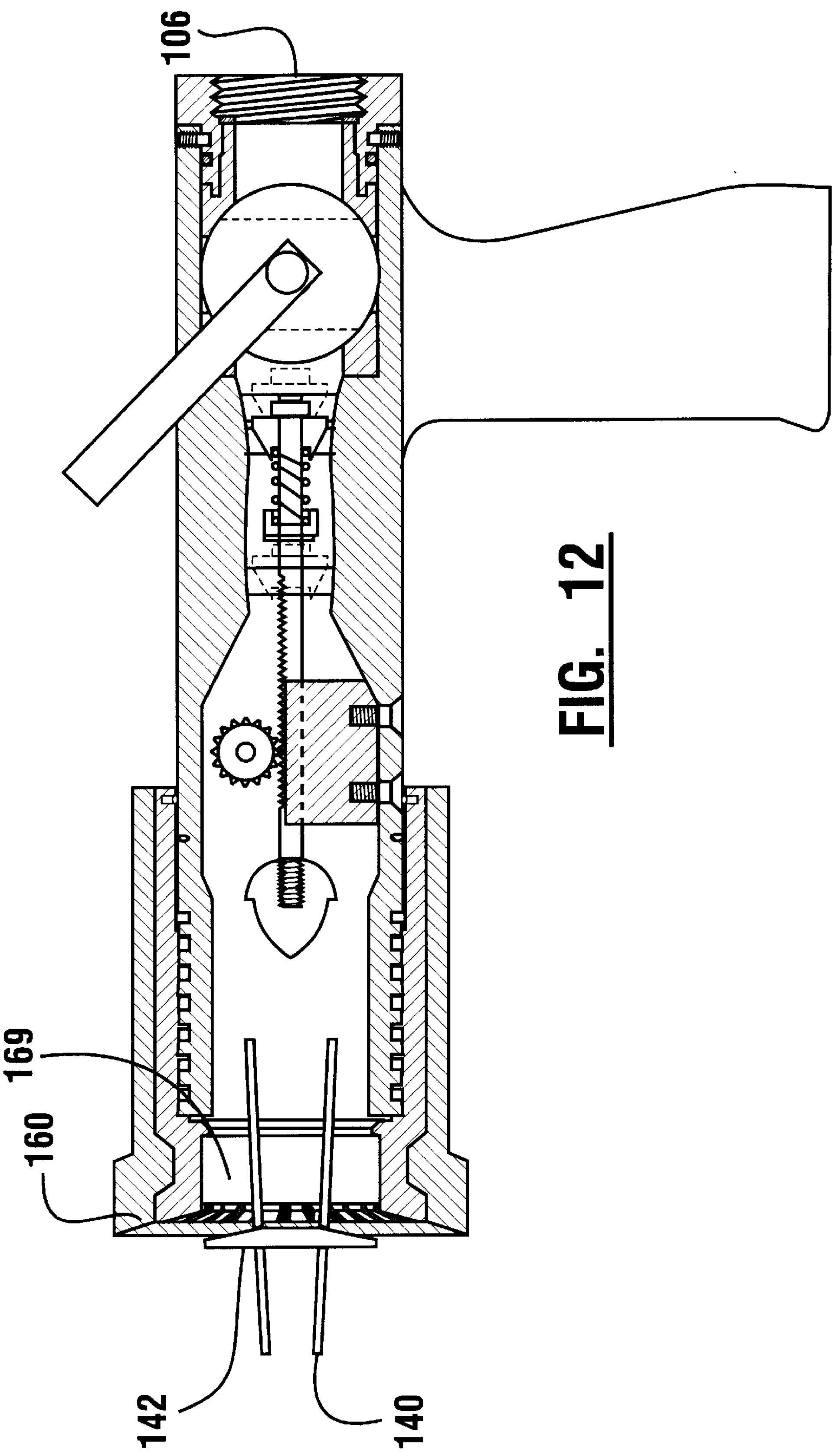
FIG. 12 is a cross-sectional view of a fire hose nozzle of the present invention with the valve in the closed position, the smooth bore barrel in the open position and the fog tip in a flush position.

In operation of the fire hose nozzle of the present invention, a solid stream of water may be discharged from smooth barrel 140. Alternatively, an aspirated spray of water may be discharged from fog tip 160. Also, a solid stream of water may be discharged from smooth barrel 140 while a spray of water is simultaneously discharged from fog tip 160. FIGS. 10–12 show flow through smooth bore barrel 140 and three flow conditions through fog tip 160.

With flows from both fog tip 160 and smooth bore barrel 140, air moving in the space between the streams is at a lower pressure than the static air outside the stream from fog tip 160, which is at atmospheric pressure. The air at atmospheric pressure outside the stream from fog tip 160 acts to prevent both streams from broadening outwardly as they travel away from fire hose nozzle 100 and makes both more aerodynamically efficient. With adequate supply pressure the two streams flowing simultaneously will each travel further than the flow from smooth bore barrel 140 alone.

With fog tip 160 as shown in FIG. 10, the flow from fog tip 160 is a straight, hollow stream. As shown in FIG. 11 the discharge end of fog tip 160 moves closer to baffle 142 as fog tip 160 is turned counterclockwise. The flow is changed from a straight, hollow stream to a progressively wider fog spray pattern. As shown in FIG. 12 fog tip 160 may be displaced longitudinally sufficient toward inlet 106 so that baffle 142 is outside fog tip 160. In this position, debris that are otherwise too large to pass through fog tip outlet chamber 169 will be expelled.

The fire fighting apparatus and method of the present invention is designed to allow fire fighters to select different flow rates. Standard fire fighting nozzle operating pressure is approximately 100 PSI, although operating pressures may vary among fire departments. A desirable nozzle flow rate at 100 PSI is 100 gallons per minute ("G.P.M.") for operation by one fire fighter. This pressure and flow rate will be used in the following description. It should be understood, however, that the present invention can be operated at other pressures and flow rates. Specifically, the present invention may be operated at approximately 200 G.P.M., but more than one fire fighter would be needed to handle the increased flow safely.

The embodiment shown in FIG. 6 is adapted for two flows: at approximately 100 PSI water supply at the nozzle, the apparatus and method can produce approximately 100 G.P.M. or approximately 200 G.P.M.

Figure 13:
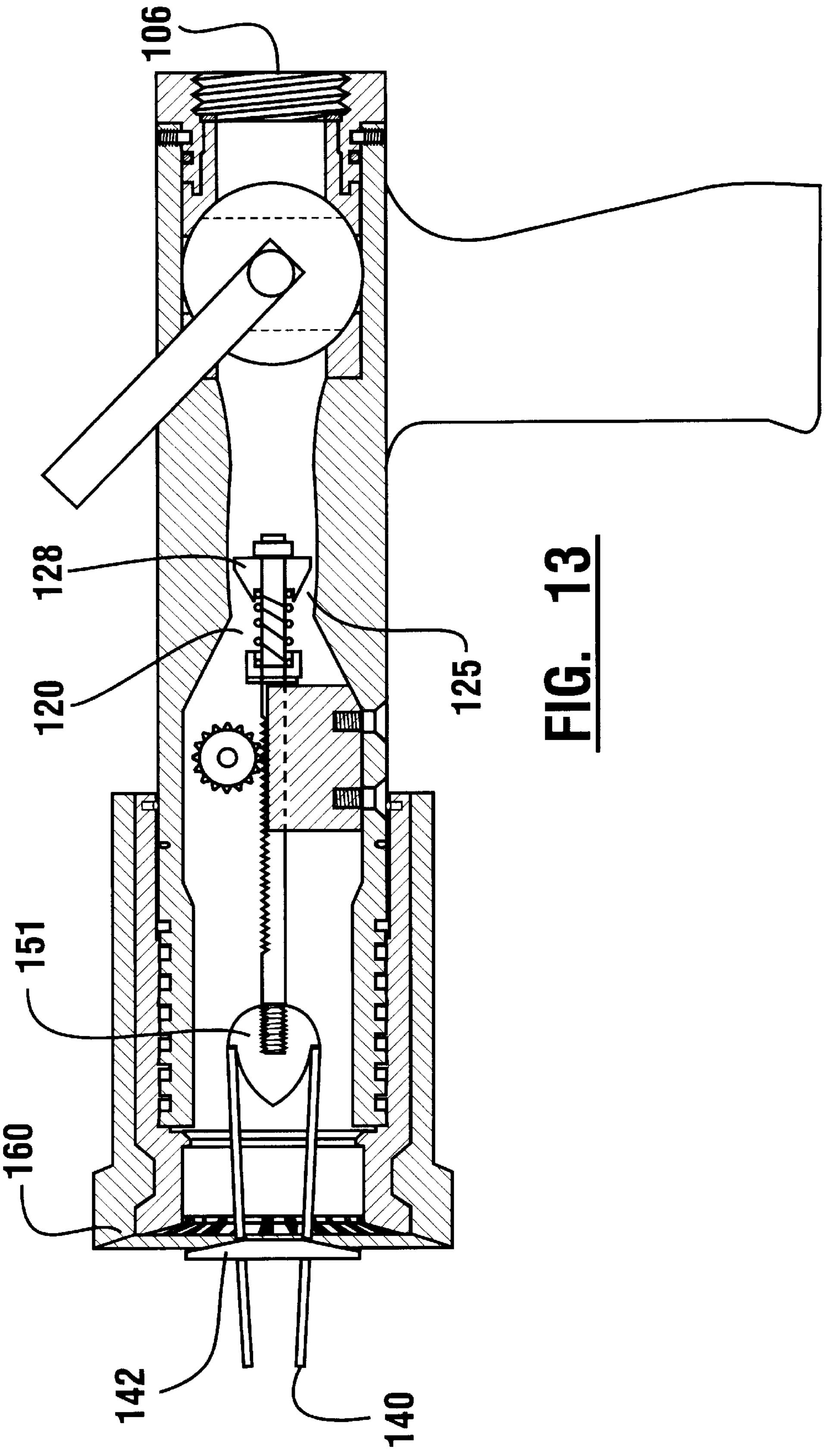
FIG. 13 is a cross-sectional view of a fire hose nozzle of the present invention with the valve in the closed position, the smooth bore barrel in the closed position and the fog tip in a flush position, and the throttle valve in a position to deliver flow to the fog tip.
Figure 14:
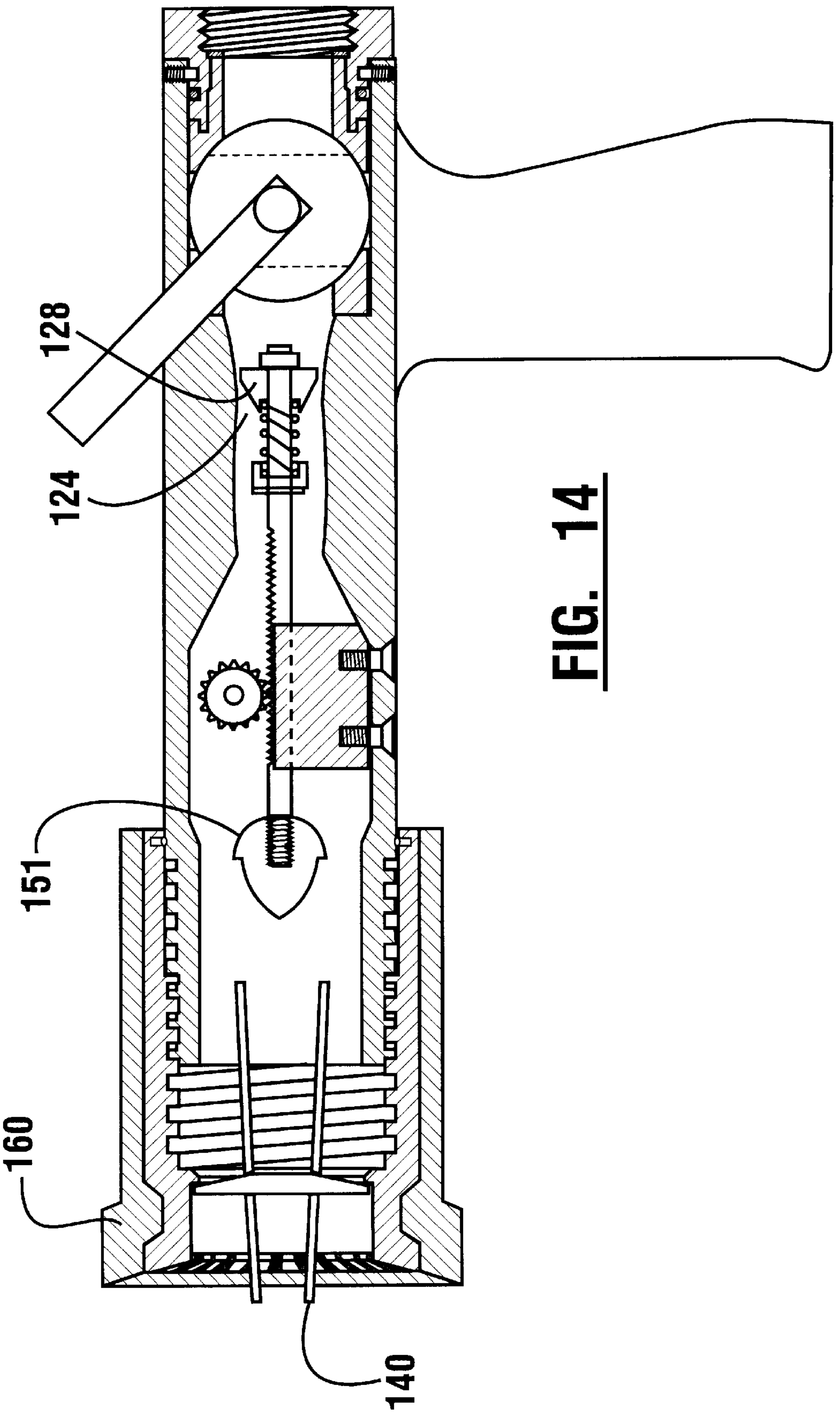
FIG. 14 is a cross-sectional view of a fire hose nozzle of the present invention with the valve in the closed position, the smooth bore barrel in the open position, the fog tip in a closed position, and the throttle valve in a position to deliver flow to the smooth bore barrel.

The 100 G.P.M. flow rate can be achieved by either fog tip 160 alone or smooth bore barrel 140 alone, or with both operating simultaneously. When flowing 100 G.P.M. through fog tip 160 only, smooth bore barrel 140 is closed by throttle valve assembly 120 in its most forward position as shown in FIG. 13. The difference in cross-sectional areas of flow restricter 128 and third taper section 125 is such that a 100 PSI water supply at taper section 125 will allow a flow of 100 G.P.M. to pass. To obtain 100 G.P.M. through smooth bore barrel 140 with fog tip 160 closed, throttle valve assembly 120 will be as shown in FIG. 14. This will place flow restricter 128 in alignment with second taper section 124. The difference in cross-sectional areas of flow restricter 128 and the area circumscribed by taper section 124 is such that a 100 PSI water supply at taper section 124 will allow a flow of 100 G.P.M. to pass.

A 100 G.P.M. flow through the combined flows of both smooth bore barrel 140 and fog tip 160 may also attained. The position of throttle valve assembly 120 and fog tip 160 are shown in FIG. 10. If throttle valve assembly 120 did not limit the total flow to 100 G.P.M., as a fire fighter opened either smooth bore barrel 140 or fog tip 160 while already using one of them, the force required to hold the nozzle would immediately double, since both discharge orifices can each individually pass 100 G.P.M. This 200 G.P.M. total would double the thrust the fire fighter must hold back. By maintaining 100 G.P.M. while both smooth bore barrel 140 and fog tip 160 are in simultaneous operation, throttle valve assembly 120 enables the fire fighter to take advantage of both the features of a smooth bore and adjustable fog nozzle at the same time without any increase in flow or force to hold back the nozzle above that required for single tip operation. Other nozzles that feature more than one type of tip do not have this feature and therefore subject fire fighters to increased thrust with every tip they activate.

Figure 15:
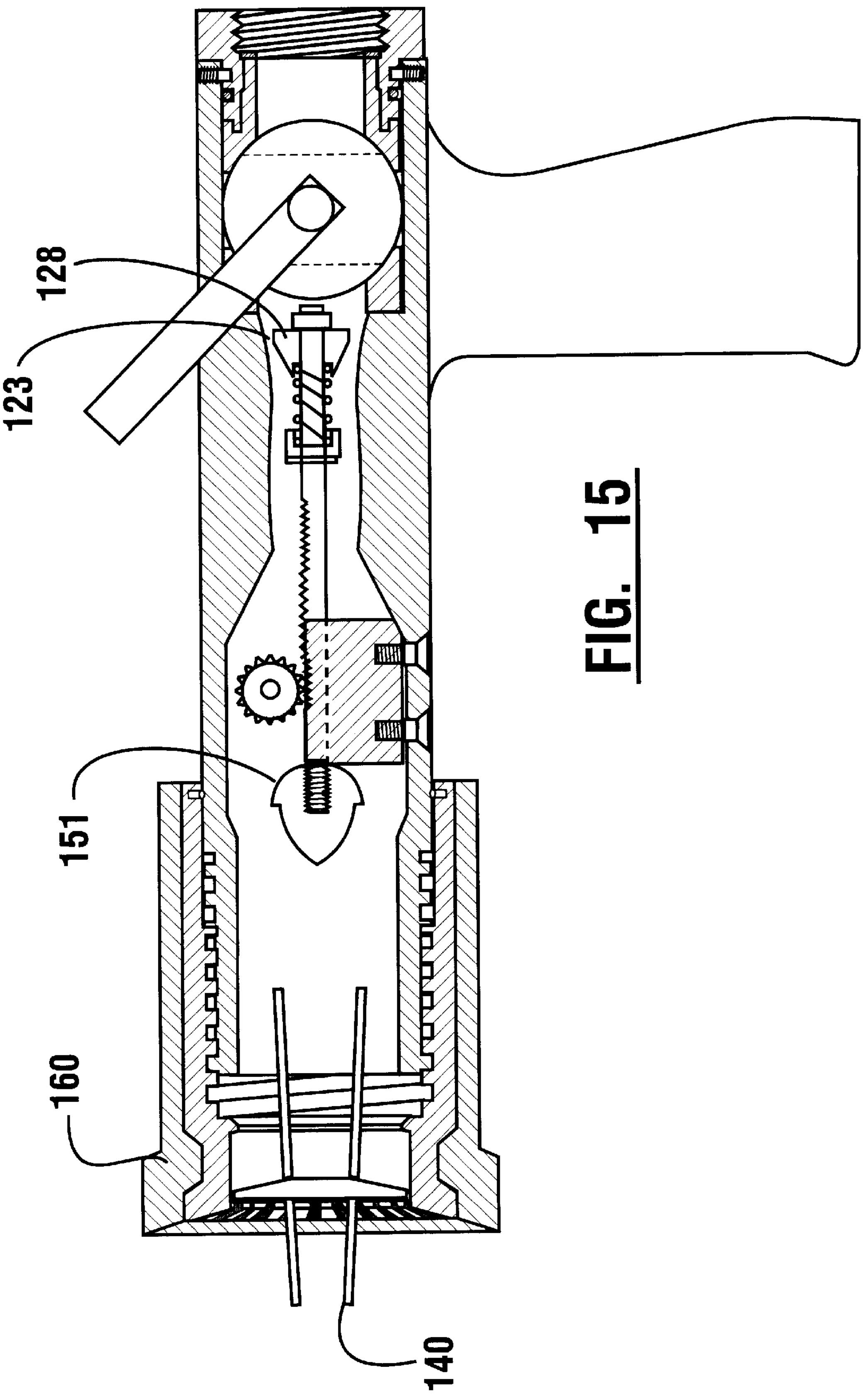
FIG. 15 is a cross-sectional view of a fire hose nozzle of the present invention with the valve in the closed position, the smooth bore barrel in the open position, the fog tip in an open position, and the throttle valve in a position to deliver flow to both the smooth bore barrel and the fog tip.

A 200 G.P.M. flow rate can be safely achieved when both smooth bore barrel 140 and fog tip 160 are open. Throttle valve assembly 120 is in its most upstream position in first taper section 123 as shown in FIG. 15. Once the fire fighters have manned the hose line with adequate personnel to operate at 200 G.P.M., the nozzle operator can turn gear 146 counterclockwise. A detent position or other indicating means can signal initiation of the higher flow. This will place flow restricter 128 into its most upstream position. The difference in cross-sectional areas between flow restricter 128 and the area circumscribed by the inlet of first taper section 123 is such that given 100 PSI water supply to throttle valve inlet 122, a flow of 200 G.P.M. will pass, with approximately 100 G.P.M. passing through smooth barrel 140 and 100 G.P.M. passing through fog tip 160.

As described above and as shown in phantom in FIG. 6, throttle valve assembly 120 may be moved upstream from tapered section 123 in throttle valve chamber inlet 122. Flow restricter 128 is displaced upstream of throttle valve chamber 112 and partially into valve chamber 110. The larger cross-sectional area of passage 104 in this position enables debris to be flushed past or around flow restricter 128 and through throttle valve chamber 112.

Whether operating only one tip or both tips and in either the 100 or 200 G.P.M., the flow rate, velocity, force, and nozzle reaction will be maintained at constant values despite increases in flow rates and pressure from the supply.

The method of the present invention includes the steps of automatically adjusting the flow of water as pressure increases, selectively varying the flow and delivering the flow to either a smooth bore barrel or a fog tip, or both.

As will be appreciated by one skilled in the art, the apparatus and method of the present invention may be used to effectively, efficiently and economically deliver smooth bore and variable fog spray flows to fires with automatic adjustment for changing pressures.

Thus the new fire hose nozzle apparatus and method of the present invention achieves the above stated objectives, eliminates difficulties encountered in the use of prior devices and systems, solves problems and attains the desirable results described herein.

In the foregoing description certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be limited to the structures shown herein or mere equivalents.

Having described the features, discoveries and principles of the invention, the manner in which it is constructed and operated, and the advantages and useful results attained, the new and useful structures, devices, elements, arrangements, parts, combinations, systems, equipment, operations and relationships are set forth in the appended claims.

I claim:

1. An apparatus for selectively discharging a stream of liquid, the apparatus comprising:

a body having an inlet end, an outlet end, and a passage extending between the inlet end and the outlet end;

the inlet end adapted for connection to a source of liquid under pressure;

the passage fluidly connecting the inlet end and the outlet end;

a throttle valve bounded by the passage, wherein the throttle valve comprises a flow restricter, and wherein the flow restricter is enabled to move within the passage toward the outlet end in response to an increase in liquid pressure and wherein the flow restricter is enabled to move within the passage toward the inlet end in response to a decrease in liquid pressure, the flow restricter cooperating with the passage to control the flow of liquid;

the outlet end adapted for discharging the stream of liquid;

a rod bounded by the passage;

a spring disposed within the passage and bounding the rod;

wherein the flow restricter is enabled to move on and relative to the rod in the direction of the passage outlet end at a liquid pressure above a selected value, and wherein the area between the flow restricter and the passage is reduced and liquid flow from the inlet end to the outlet end is reduced.

2. The apparatus of claim 1 wherein the rod is bounded by the passage and is coaxial therewith, and wherein the rod is selectively displaceable within the passage.

3. The apparatus of claim 1 wherein the body has a first member and a second member, the second member being longitudinally displaceable along the first member.

4. The apparatus of claim 1 wherein the throttle valve further comprises:

the flow restricter having a first end and a second end, the first end disposed toward the passage inlet end and the second end disposed toward the passage outlet end, the flow restricter further having an aperture extending between the first end and the second end;

wherein the rod is coaxial with the passage, and wherein the rod is further bounded by the flow restricter aperture;

wherein the spring is disposed between the flow restricter second end and the passage outlet end, and wherein the spring has a first end mechanically connected to the rod and a second end adjacent the flow restricter.

5. The apparatus of claim 1 wherein the flow restricter is moveable on the rod within the passage in response to changes in liquid pressure, wherein the passage has a cross-sectional area larger at the outlet end than at the inlet end, wherein the passage is circular in cross-section at any cross-section between the inlet end and the outlet end, and wherein the decrease in passage cross-sectional area from the outlet end to the inlet end is parabolically shaped.

6. The apparatus of claim 5 wherein the flow restricter further being circular in cross-section at any cross-section between the first end and second end, and wherein the largest cross-section is smaller than the smallest cross-section of the passage.

7. The apparatus of claim 1 wherein the inlet end is a threaded hose connection.

8. The apparatus of claim 3 wherein the second member is threadably connected with the first member.

9. The apparatus of claim 7 wherein the outlet end is a nozzle.

10. The apparatus of claim 7 wherein the outlet end is a threaded hose connection.

11. The apparatus of claim 9 wherein the nozzle is adjustable.

12. The apparatus of claim 11 wherein the stream of liquid discharged therefrom is a fog spray.

13. The apparatus of claim 11 wherein the stream of liquid discharged therefrom is a solid stream.

14. An apparatus for selectively discharging a stream of liquid, the apparatus comprising:

a body having:

a first member adapted for connection to a source of liquid under pressure;

a second member, the second member being longitudinally displaceable along the first member;

a tubular barrel extending outwardly from the first member and bounded by the second member, wherein the tubular barrel comprises an input end and a discharge end, wherein the tubular barrel is adapted to discharge liquid therethrough;

an inlet end disposed in the first member; and an outlet end;

a passage extending between the inlet end and the outlet end, the passage fluidly connecting the inlet end and the outlet end, wherein the passage has a plurality of chambers therein;

a throttle valve bounded by a passage chamber, wherein the throttle valve comprises a flow restricter, and wherein the flow restricter is enabled to move within the passage chamber toward the outlet end in response to an increase in liquid pressure and wherein the flow restricter is enabled to move within the passage chamber toward the inlet end in response to a decrease in liquid pressure, the flow restricter cooperating with the passage chamber to control the flow of liquid; and the body second member and the tubular barrel adapted for discharging the stream of liquid.

15. The apparatus of claim 14, and further comprising a rod, wherein the rod is bounded by the passage and is coaxial therewith, and wherein the rod is selectively displaceable within the passage.

16. The apparatus of claim 14 wherein the passage chamber comprises a passage throttle valve chamber, wherein the passage throttle valve chamber comprises a plurality of tapered sections, each tapered section having a cross-sectional area larger at the inlet end than at the outlet end.

17. The apparatus of claim 14 wherein a stream of liquid is selectively dischargeable from the tubular barrel alone, the second body member alone, and both the tubular barrel and the second body member simultaneously.

18. The apparatus of claim 14 and further comprising a rod bounded by the passage; and a spring disposed within the passage.

19. The apparatus of claim 14 wherein the throttle valve further comprises:

the flow restricter having a first end and a second end, the first end disposed toward the passage chamber inlet end and the second end disposed toward the passage chamber outlet end, the flow restricter further having an aperture extending between the first end and the second end;

a rod, wherein the rod is bounded by the passage and is coaxial therewith, and is further bounded by the flow restricter aperture; and a spring bounding the rod and disposed between the flow restricter second end and the passage outlet end.

20. The apparatus of claim 18 wherein the flow restricter is enabled to move on and relative to the rod in the direction of the outlet end at a liquid pressure above a selected value, whereby the area between the flow restricter and the passage chamber is reduced and liquid flow from the inlet end to the outlet end is reduced.

21. The apparatus of claim 19 wherein the flow restricter is enabled to move on and relative to the rod in the direction of the outlet end at a liquid pressure above a selected value, whereby the area between the flow restricter and the passage chamber is reduced and liquid flow from the inlet end to the outlet end is reduced, wherein the spring has a first end mechanically connected to the rod and a second end adjacent the flow restricter.

22. The apparatus of claim 21 wherein the rod is selectively displaceable within the passage.

23. The apparatus of claim 22 wherein the rod has teeth disposed outwardly therefrom, and further comprising a gear, the teeth and the gear cooperating to enable the rod to be displaced within the passage toward the outlet end.

24. The apparatus of claim 16 and further comprising a rod, wherein the rod is bounded by the passage and is coaxial therewith; and wherein the rod is selectively displaceable to selectively locate the throttle valve within one of the tapered sections.

25. The apparatus of claim 24 and further comprising a plug, wherein the plug is in attached relation with an end of the rod disposed toward the outlet end and is displaceable into sealing relation with the tubular barrel.

26. The apparatus of claim 19 wherein body second member has teeth disposed inwardly into the passage whereby a stream of liquid discharged from body second member is aspirated.

27. The apparatus of claim 19 and further comprising a baffle, wherein the baffle is in attached relation with the tubular barrel and wherein the body second member is in displaceable surrounding relation with the baffle.

28. The apparatus of claim 27 wherein body second member is displaceable to enable discharge of an aspirated stream of liquid, wherein the direction of the stream is variable angularly with respect to the body.

29. The apparatus of claim 19 wherein a stream of liquid is dischargeable selectively from the tubular barrel, the body second member, and the combination of the tubular barrel and the body second member.

30. The apparatus of claim 17 wherein liquid is selectively dischargeable as a solid stream alone, as a fog spray alone, or as both a solid stream and a fog spray simultaneously.

31. A method for selectively discharging a stream of liquid, the method comprising:

connecting a source of liquid under pressure to:

a body having:

an inlet end adapted for connection to the source of liquid under pressure;

an outlet end adapted for discharging the stream of liquid;

a passage extending between the inlet end and the outlet end, the passage fluidly connecting the inlet end and the outlet end;

a throttle valve bounded by the passage, wherein the throttle valve comprises a flow restricter, and wherein the flow restricter is enabled to move within the passage toward the outlet end in response to an increase in liquid pressure and wherein flow restricter is enabled to move within the passage toward the inlet end in response to a decrease in liquid pressure, the flow restricter cooperating with the passage to maintain the flow of liquid;

a rod bounded by the passage;

a spring disposed within the passage and bounding the rod;

wherein the flow restricter is enabled to move on and relative to the rod in the direction of the passage outlet end at a liquid pressure above a selected value, and wherein the area between the flow restricter and the passage is reduced and liquid flow from the inlet end to the outlet end is reduced; and discharging the stream of liquid from the outlet end.

32. A method for selectively discharging a stream of liquid, the method comprising:

connecting a source of liquid under pressure to:

a body having:

a first member adapted for connection to a source of liquid under pressure;

a second member, the second member being longitudinally displaceable along the first member;

a tubular barrel extending outwardly from the first member and bounded by the second member, wherein the tubular barrel comprises an input end and a discharge end, wherein the tubular barrel is adapted to discharge liquid therethrough;

an inlet end disposed in the first member; and an outlet end;

a passage extending between the inlet end and the outlet end, the passage fluidly connecting the inlet end and the outlet end, wherein the passage has a plurality of chambers therein;

a throttle valve bounded by a passage throttle valve chamber, wherein the throttle valve comprises a flow restricter, and wherein the flow restricter is enable to move within the passage throttle valve chamber toward the outlet end in response to an increase in liquid pressure and wherein the flow restricter is enabled to move within the passage throttle valve chamber toward the inlet end in response to a decrease in liquid pressure, the flow restricter cooperating with the passage throttle valve chamber to maintain the flow of liquid; and discharging the stream of liquid from the body second member and the tubular barrel.

* * * * *